United States Patent

[11] 3,552,544

| [72] | Inventor | Pierre Patin |
| | | 58, rue de Sèvres 92, Boulogne-sur-Seine, France |
| [21] | Appl. No. | 808,728 |
| [22] | Filed | Mar. 20, 1969 |
| [45] | Patented | Jan. 5, 1971 |
| [32] | Priority | Apr. 4, 1968 |
| [33] | | France |
| [31] | | No. 147,042 |

[54] VARIABLE SPEED CONVEYOR
12 Claims, 8 Drawing Figs.

[52] U.S. Cl. .................................................. 198/219, 198/110
[51] Int. Cl. ................................................ B65g 25/00
[50] Field of Search ........................................ 198/219, 218, 34, 16, 110, 16MS

[56] References Cited
UNITED STATES PATENTS
1,853,392   4/1932   Zesbaugh ..................... 198/110
2,959,271   11/1960  Adamson ..................... 198/140

Primary Examiner—Hugo O. Schulz
Attorney—Cameron, Kerkam & Sutton

ABSTRACT: A variable speed conveyor comprising a series of closely-spaced oblong elements the upper faces of which form the conveying surface, each element extending transversely of the conveyor and being orbited rapidly in a plane perpendicular to said surface while remaining parallel to itself under the action of a drive unit, the drive units imparting to said elements orbital movements of vibratory nature which are progressively variable from the first element to the last one.

PATENTED JAN 5 1971

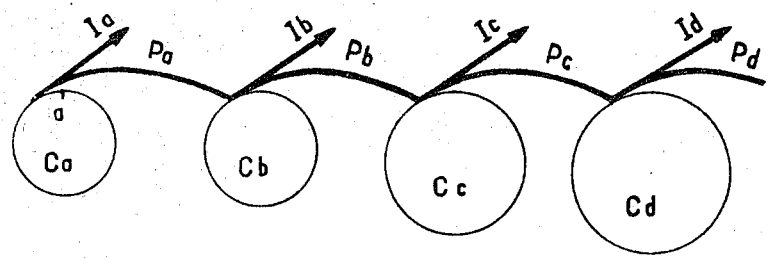
Fig. 4
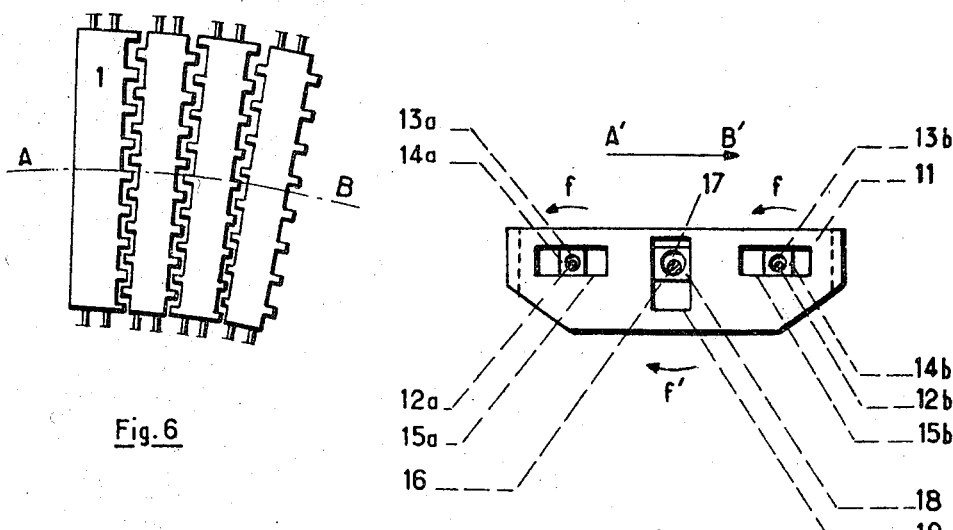
Fig. 6
Fig. 8
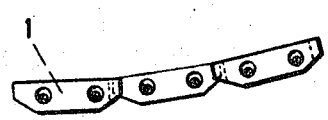
Fig. 7

VARIABLE SPEED CONVEYOR

This invention relates to conveyors for transporting people or objects from one place to another.

Conventionally conveyors are use traveling aprons or rollers to provide a conveying surface which travels at a uniform speed. Acceleration or deceleration of objects or persons on the conveyor is often achieved by using several conveyors which are driven at different speeds and which extend parallel to one another. This technique involves a lateral transfer of objects or people from one conveyor to the next.

Although objects can be easily guided so that they transfer laterally, it is not so easy to laterally guide people, people. Also, the space required in width for such a system prevents it being used satisfactorily in junction tunnels of underground transport networks although there are very great advantages in being able to control the speed of travel of passengers through junction tunnels of underground systems.

For overcoming such drawbacks the main object of this invention is to provide a variable speed conveyor aligned along the direction of conveyance.

Another object of the present invention is to provide a variable speed conveyor of the character described which has a conveying surface formed by the upper faces of closely-spaced oblong elements each extending transversely of the conveyor and mounted to be orbited rapidly in a plane perpendicular to said surface while remaining parallel to itself when an associated drive unit is operated, said drive units being adapted to impart to the elements orbital movements of vibratory nature which are progressively variable from the first element to the last one.

The elements may comprise plates of generally rectangular shape and their movement is such that an object placed on the conveyor is subjected to a motion which is part rotary and has a translatory component extending in the direction of movement of the conveying surface. The object or person traveling along the conveyor is conscious of a slight vibration, as the rapid rise and fall of the surface on which the object or person rests is of the order of, for example, a tenth of a millimetre. As the elements of a conveyor are submitted to orbital movements of vibratory nature which are progressively variable in amplitude or frequency, from the first element to the last one, the people or objects on the conveying surface can be accelerated, decelerated, or accelerated then decelerated as required. Moreover, the elements are separate from one another so that he the conveyor can be used to transport people or objects around corners and also up and down inclines. These advantages enable the invention to be used to carry objects or people between different stations travelling at different relative speeds.

The invention will now be described in more detail, by way of examples, with reference to the accompanying largely diagrammatic drawings, in which.

Figure 5:
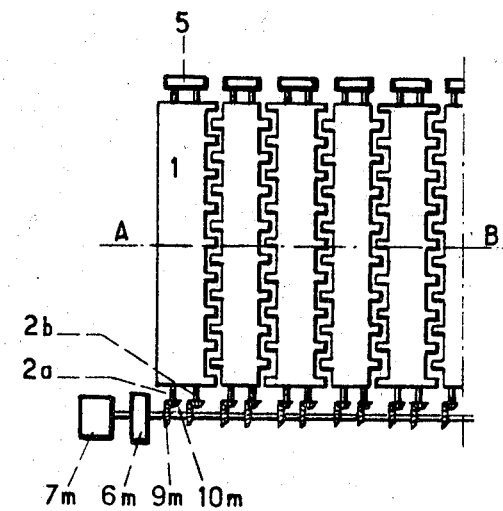

FIG 4 diagrammatically illustrates the trajectory of an object transported along the conveyor;

FIG. 5 illustrates a part of a second form of conveyor using a modified drive system;

FIG. 6 illustrates how the conveyor can be used to convey objects or persons around corners;

FIG. 7 illustrates how the conveyor can be used to convey objects or persons up an inclined path; and FIG. 8 is a sectional view of an alternative method of driving an element of the conveyor.

In the following description the variable speed conveyor will be described as an accelerating conveyor although it will be understood that the same principles can be used whether the conveyor is a decelerating conveyor or an accelerating-decelerating conveyor.

Figure 1:
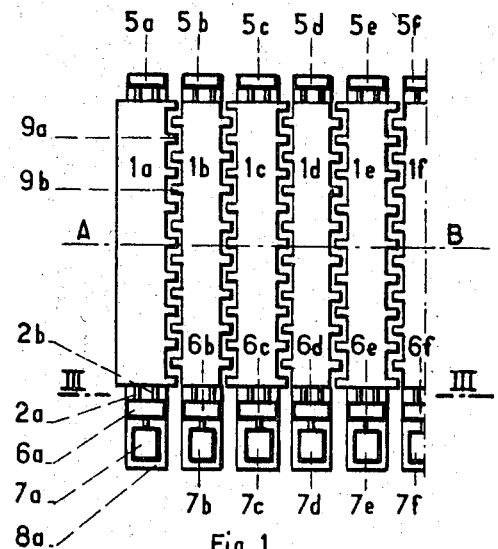
FIG. 1 is a plan view of apart of a conveyor.

Referring to FIG. 1, the conveyor comprises a multiplicity of oblong plate elements $1a\ l$ to $1f$ whose rectangular upper faces form the upper surface of the conveyor. The conveying direction is from A to B. As shown, the rectangular elements extend across the conveyor.

Figure 2:
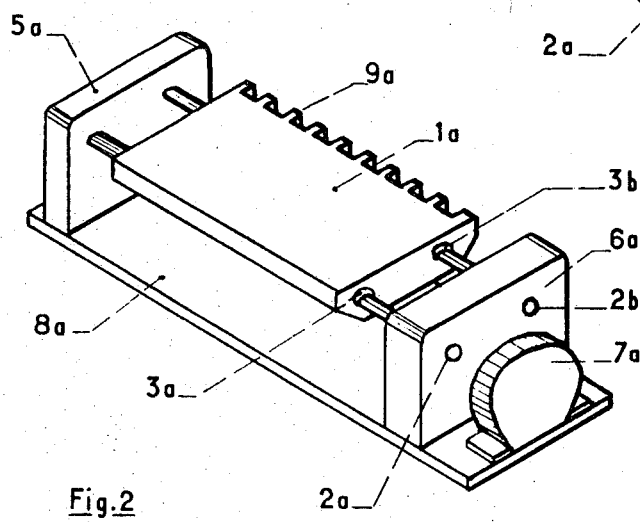
FIG. 2 is a perspective view of an element of the conveyor.

Turning now to FIG. 2 which shows the element $1a$, this shows how the element is mounted. All of the other elements are similarly mounted. The mounting consists of a pair of parallel shafts $2a$ and $2b$ located in a plane parallel to AB and which are provided with two pairs of equal eccentrics $3a$ and $3b$, the eccentrics of each pair being disposed in bearings at opposite ends of the element $1a$. The eccentrics each have a cylindrical external surface which fits into respective complementary bearings provided in the ends of the element $1a$. At one end of the element $1a$ the shafts $2a$ and $2b$ fit into bearings on a bearing support $5a$ disposed at one end of a support plinth $8a$. The other ends of the shafts $2a$, $2b$ extend into a gearbox $6a$ providing a speed multiplier to which drive is imparted by a motor $7a$ mounted with the gearbox $6a$ on the plinth $8a$.

The degree of eccentricity of the twin pair of equal eccentrics $3a$ and $3b$ fitted on each of the plate elements increases gradually from late $1a$ to plate $1f$. The drive motors $7a$ and to $7f$ are operated in synchronism in a conventional way, for example by means for an electric shaft.

The larger edges of the elements extending alongside one another are provided with interleaving rows of teeth $9a$ and $9b$ which have sufficient transverse and longitudinal clearances between them to allow the elements to move individually without touching one another whatever the variations of the eccentrics may be.

The underlying principle of operation of the conveyor will be understood from FIG. 4. Each plate 1 driven by the twin pair of eccentrics $3a$ and $3b$ on which it is mounted effects a complex movement on an object or person on the upper face of the element which combines a translatory motion parallel to a plane determined by the vertical direction and the direction of conveyance AB with an arcuate motion around a circle C that is a function of the eccentricity of the eccentrics. The object or person is submitted by said arcuate motion to a tangential impulse $Ia$ due to the centrifugal force. The vertical component of said impulse $Ia$ must be greater than the gravity $g$ before the uppermost point $a$ of circle $Ca$ so that the conveyed person or object leaves the plate $1a$. During the remainder of the orbital cycle of the element the conveyed person or object falls freely under gravity along a parabolic arc $Pa$. The free fall time is very short as also is the vertical distance of free fall being normally, for example, of the order of only a tenth of a millimetre. The object or person is conveyed along by a succession of tangential impulses $1a$ and free falls along the parabolic arc $Pa$, the number depending on the width of the plate element 1 and on the longitudinal dimension of the object or person that is being carried by it.

The object or person then meets the plate $1b$ which has an eccentric providing a rather greater degree of eccentricity denoted by the circle $Cb$. The process of tangential impulses $Ib$, followed by free falls along the parabolic path $Pb$ is repeated and as a result of the progressive increase in the radii of the circles $Ca$ to $Cd$, the tangential impulse increases from the value $1a$ to the rather larger value $Id$ to produce correspondingly increased horizontal component. As the vertical component acting on the body or person and produced by gravity is constant, the lengths of the parabolic arcs increase so that the horizontal transfer of the person or object speeds up. If the conveyor is being used to accelerate pedestrians, all that is felt is a vibration of a very limited amplitude.

In the embodiment shown in FIG. 5 the elements 1 are similarly supported and arranged but they are all driven by a single motor $7m$. This drives a gearbox $6m$ providing a speed multiplier to rotate a shaft extending parallel to the direction of conveyance at a subtantially high speed. Onto the shaft are keyed crown gear wheels $9m$ which are arranged in pairs and mesh with bevel gears $10m$ also arranged in pairs on shafts $2a$, 2b supporting respective plates 1. The synchronism of the movement of the elements of the conveyor is now achieved automatically and the velocity imparted to a body or person on the conveying surface is a function of the degree of the eccentrics on the shafts 2a, 2b.

FIGS. 6 and 7 show how the conveyor can cope with changes in direction. In the case of FIG. 6, the conveyor is travelling around a bend. The driving systems of the individual plate elements 1 are not shown but they can be of either of the types already described. The teeth 9 on the opposed edges of the plates 1 interleave with one another but it will be seen that their clearances are such that they allow the longitudinal axes of the plates to diverge outwardly towards the edge of the bend without affecting the property of the conveyor to transport objects or people around the bend.

Similarly in the case of an ascending system, as illustrated in FIG. 7, the clearances between the interleaving teeth 9 are such that they allow the plates to diverge upwardly.

Turning now to the embodiment shown in FIG. 8, the plate element follows an elliptical orbital path rather than a circular one as in the case of the earlier described embodiments. The plate element 11 is provided with two shafts 12a and 12b which lie in a plane parallel to the arrow A' B' which denotes the conveying direction. The shafts 12a and 12b are disposed close to the longer edges of the plate element 11 and are provided with eccentrics 13a and 13b passing through complementary bearings in support blocks 14a and 14b which are slidable along horizontal slots 15a and 15b formed in plate element 11. The eccentrics and 13a and 13b have the same degree of eccentricity and are identically orientated. The shafts 12a and 12b are also driven at the same speed and in the same direction $f$.

A third shaft 16 lying in the same plane as the shafts 12a and 12b but driven in the opposite direction $f'$ extends through the plate element 11 midway between them. The shaft 16 is rotated in the opposite direction $f'$ to the shafts 12a and 12b for counterbalancing, and is fitted with two relatively larger eccentrics 17 having a greater degree of eccentricity that the twin eccentrics 13a and 13b associated with the two side shafts 12a and 12b. The eccentrics 17 run in respective bearing blocks 18 which are slidable in vertical channels 19 formed in plate element 11.

During operation of the conveyor, the plate element 11 prescribes an elliptical path having a horizontal component determined by the degree of eccentricity of the eccentric 17 and a vertical component determined by the degree of eccentricity of the eccentrics 13a and 13b. In practice, the length of the major axis of the shallow horizontal elliptical orbit is approximately twice as long as the minor axis of the ellipse which determines the vertical rise and fall of the plate element.

In the case of an accelerating conveyor using the plates of FIG. 8, the eccentricity of the the eccentrics 13a, 13b as well as that of eccentric 17 are increased progressively from one plate 11 to the next, but generally without proportionality, the eccentricity of eccentric 17 acting on the horizontal speed while that of eccentrics 13a, 13b determines the time when the conveyed person or object leaves the plate 11. The plates 11 are provided along their longer sides with spaced teeth as described in earlier embodiments of the invention. The system used for driving the plates of FIG. 8 can be either of those described in earlier FIGS.

In all of the embodiments described, the acceleration of an object or person on the conveyor surface is produced by a gradual increase in the vertical amplitude of the orbital movement of successive plates. However, the acceleration can also be produced by increasing the speed of rotation of the support shafts so that the orbital frequency increases. If one wishes, the eccentricities of the eccentrics 3a and 3b in FIGS. 1 to 3, or 13a, 13b and 17 in FIG. 8, may be the same for all of the plates but the speeds generated by either the motors 7 or the gearboxes 6 increase progressively from one plate to the next in the direction of conveyance.

Where a single motor is used as shown in FIG. 5, the crown gear wheels 10m may have their diameters progressively decreased in successive pairs so that the associated elements orbit a progressively increasing velocities.

Figure 3:
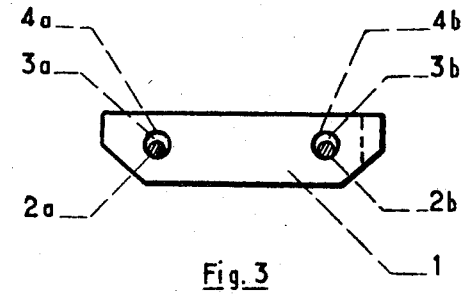
FIG. 3 is a section of one element of FIG. 1 and taken along the line and in the direction indicated by the arrows III—III in FIG. 1.

In the case of a decelerating conveyor, the eccentricity of the eccentrics 3a and 3b of FIGS. 1 to 3, or those of the eccentrics 13a, 13b and 17 of FIG. 8, can be arranged to progressively decrease over the decelerating distance. Alternatively, or in addition, the rotational speeds of the motors 7 or the outputs of the gearboxes 6 providing the speed multipliers may be decreased also in order to decelerate a carried object or person. In like manner, where the arrangement of FIG. 5 is used utilizing a single motor 7m the crown gear wheels 10m may have progressively increasing diameters in order to reduce the shaft speeds producing orbital movement of the elements.

Similarly the orbital movement of the plates may be generated by any known means, such as electromagnets and springs, and not exclusively by means of eccentrics.

I claim:

1. A Variable speed conveyor comprising a series of closely-spaced oblong elements disposed in succession transversely of the direction of conveyance and the upper faces of which form the conveying surface, means of for imparting to each element an orbital movement of vibratory nature in a plane perpendicular to said surface while said element remains parallel to itself, and means for progressively varying the vibratory nature of the orbital movements from the first element to the last one.

2. A variable speed conveyor as claimed in claim 1, wherein the vibratory nature of the orbital movements progressively varies in amplitude.

3. A variable speed conveyor as claimed in claim 1, wherein the vibratory nature of the orbital movements progressively varies in frequency.

4. A variable speed conveyor comprising a series of closely-spaced oblong elements disposed in succession transversely of the direction of conveyance and the upper faces of which form the conveying surface, stationary transverse shafts lying in a plane parallel to said surface and adapted to support each element, drive means for rotary driving said shafts, and means for imparting to each element an orbital movement of vibratory nature in a plane perpendicular to said surface while said element remains parallel to itself, the vibratory nature of the orbital movements progressively varying from the first element to the last one.

5. A variable speed conveyor as claimed in claim 4, wherein the elements have substantially flat upper faces and are provided along their neighboring sides with rows of teeth which interleave with one another with sufficient clearance to allow orbital movement of the elements without touching one another.

6. A variable speed conveyor as claimed in claim 4, wherein the means for imparting to each element an orbital movement of vibratory nature comprises a pair of eccentrics with equal eccentricity carried by each supporting shaft near its ends and means provided in said element for housing said eccentrics.

7. A variable speed conveyor as claimed in claim 6, wherein the eccentricities of the eccentrics progressively varies from the first element to the last one, and wherein the drive means rotary drives the supporting shafts at the same rotary speed.

8. A variable speed conveyor as claimed in claim 6, wherein the eccentrics are equal for all the elements, and wherein the drive means rotary drives the supporting shafts at a progressively varying speed from the first element to the last one.

9. A variable speed conveyor as claimed in claim 6, having two shafts for supporting each element and wherein each element is provided with bearings for supporting the corresponding eccentrics which eccentrics have the same eccentricity for said two shafts, whereby the orbital movement of each element is circular.

10. A variable speed conveyor as claimed in claim 6, having three shafts for supporting each element, the center shaft being rotated in the opposite direction to the two side shafts and the eccentrics of said center shafts being of greater diameter than those of the side shafts, wherein each element is provided with lateral central vertical channels and with a pair of lateral side horizontal channels, and wherein bearing blocks movable vertically in said vertical channels and horizontally in said horizontal channels respectively support the eccentrics of said three shafts, whereby the orbital movement of each element is elliptical.

11. A variable speed conveyor as claimed in claim 4, wherein the conveying surface follows a nonlinear path.

12. A variable speed conveyor as claimed in claim 4, wherein the conveying surface follows a nonplanar path.